UNITED STATES PATENT OFFICE.

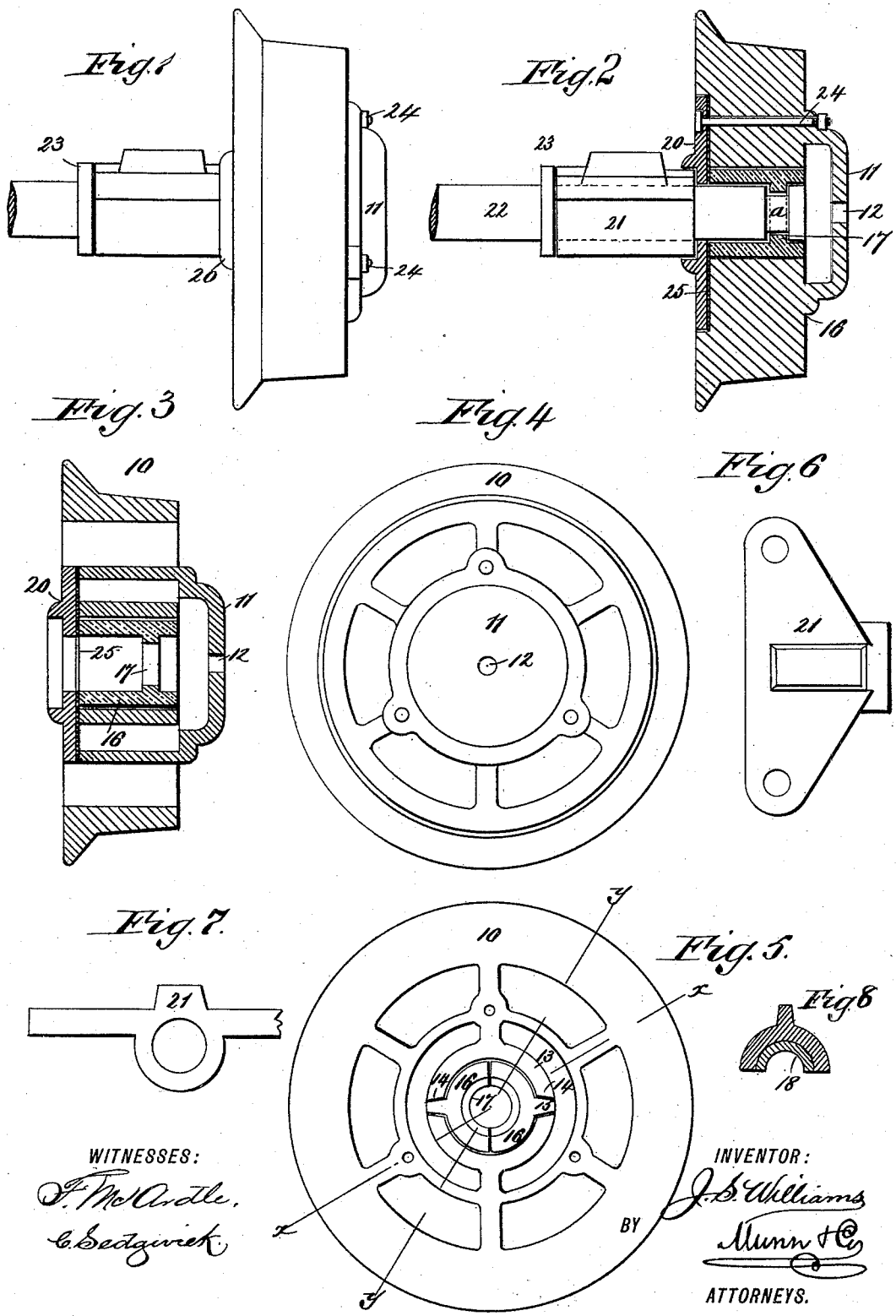

JESSE S. WILLIAMS, OF BEAVER DAM, KENTUCKY.

CAR-WHEEL AND BEARING.

SPECIFICATION forming part of Letters Patent No. 397,677, dated February 12, 1889.

Application filed October 22, 1888. Serial No. 288,810. (No model.)

*To all whom it may concern:*

Be it known that I, JESSE S. WILLIAMS, of Beaver Dam, in the county of Ohio and State of Kentucky, have invented a new and Improved Car-Wheel and Bearing, of which the following is a full, clear, and exact description.

My present invention relates to that class of car-wheels and bearings illustrated, described, and claimed in Letters Patent of the United States No. 325,466, granted to me on the 1st day of September, 1885, the main object of the present invention being to protect the end of the axle in connection with which the wheel is employed, which object I accomplish by forming the wheel with an outer cap, said cap being integral with the body of the wheel. Other objects than the one above referred to are aimed at and accomplished by means of the construction to be hereinafter described.

Reference is to be had to the accompanying drawings, forming a part of this specification, in which similar figures of reference indicate corresponding parts in all the views.

Figure 1 is a side view of a car-wheel constructed in accordance with the terms of my invention. Fig. 2 is a sectional view of the same, taken on a line corresponding with the line $x\ x$ of Fig. 5. Fig. 3 is a sectional view taken on a line corresponding with the line $y\ y$ of Fig. 5. Fig. 4 is a view of the outer face of the wheel. Fig. 5 is a view of the inner face of the wheel, the rear cap being removed. Fig. 6 is a plan view of the bearing. Fig. 7 is an end view of the same, and Fig. 8 is a cross-sectional view of one of the brasses.

In constructing such a wheel as the one illustrated in the drawings above referred to, I cast the wheel 10 with a box or cap, 11, formed with an aperture, 12, through which the lubricating material is introduced. The hub 13 is formed with recesses 14 that are adapted to receive flanges 15, formed upon the brasses 16, said brasses being preferably made in semicircular sections and with internal flanges, 17, the brasses being preferably lined with Babbitt metal or other proper anti-friction metal, as shown at 18 in Fig. 8. To the rear face of the wheel there is bolted a cap, 20, which serves as an abutment for the outer face of the bearing 21, said bearing being arranged for connection with the car-body.

The axle 22, employed in connection with the wheel above described, is formed with a collar, 23, and in applying the wheel the axle is first passed through the bearing 21, the cap 20 is then placed in position upon the axle, the brasses 16 are applied, their flanges 17 resting in a circumferential groove, $a$, formed near the end of the axle, and then the wheel 10 is placed as shown in Figs. 1 and 2, the cap 20 being bolted to the wheel by bolts 24. The wheel will thus be securely held upon the axle, and as the end of the axle does not extend beyond the hub of the wheel, it will be relieved from many of the shocks to which a projecting axle end would be exposed. I prefer to make the cap 11 so that it will extend only slightly beyond the outer face of the wheel, as by so doing I decrease the liability to accidents.

The lubricant necessarily employed is introduced through the aperture 12 and finds its way to the axle as the wheel revolves, all leakage at the rear being prevented by means of a rubber or other packing—such as that shown at 25—said packing being introduced between the cap 20 and the wheel-hub, as illustrated.

Having thus described my invention, I claim as new and desire to secure by Letters Patent—

The hereinbefore-described improvement in car-wheels and bearings, consisting of an axle formed with a fixed collar and a circumferential groove, a wheel provided with an outer apertured cap formed integral therewith, recesses formed in the hub, brasses arranged within said wheel-hub having projections fitting the recesses in the hub and flanges adapted to enter the groove of the axle, an inner cap, and bolts by which the cap is secured to the wheel, all arranged substantially as shown and described.

JESSE S. WILLIAMS.

Witnesses:
W. T. HAYWARD,
JOHN P. BARRETT.